United States Patent
Bolgar et al.

(10) Patent No.: US 7,448,851 B2
(45) Date of Patent: Nov. 11, 2008

(54) SEAL ARRANGEMENT

(75) Inventors: Crispin D. Bolgar, Nottingham (GB); Benjamin A. Leishman, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/434,909

(22) Filed: May 17, 2006

(65) Prior Publication Data

US 2007/0065286 A1     Mar. 22, 2007

(30) Foreign Application Priority Data

May 19, 2005 (GB) ................. 0510183.7

(51) Int. Cl.
*F01D 11/02* (2006.01)
(52) U.S. Cl. .................... 415/173.7; 415/196
(58) Field of Classification Search ............ 415/173.7, 415/196, 168.1; 416/190, 224
See application file for complete search history.

(56) References Cited

U.S. PATENT DOCUMENTS 4,897,021 A * 1/1990 Chaplin et al. ............ 415/173.7

2004/0031270 A1  2/2004  Sileo
2004/0031271 A1  2/2004  Jorgensen

FOREIGN PATENT DOCUMENTS

EP           1 433 926 A       6/2004
WO       WO 02/33224 A        4/2002

* cited by examiner

*Primary Examiner*—Richard Edgar
(74) *Attorney, Agent, or Firm*—W. Warren Taltavull; Manelli Denison & Selter PLLC

(57) ABSTRACT

A seal arrangement 30 presents a barrier in the form of a combined seal and anti-fret liner 36 across a shroud ring cavity 32 in order to inhibit air leakage in the platform gap between platforms 33. It will be understood that these gaps are provided for thermal expansion and vibration of vane assemblies but create a leakage path between passage 35 and cavity 32 which can increase aerodynamic losses and therefore reduce engine compressor efficiency. By provision of a combined seal and anti-fret liner 36 such air losses are reduced whilst combining the function of an air leakage seal and an anti-fret liner to prevent abrasive degradation of the mountings 37, 39 and platform section 33 ensures that there is a reduced component count as well as cost, weight and assembly time.

8 Claims, 2 Drawing Sheets

PRIOR ART Fig.3.
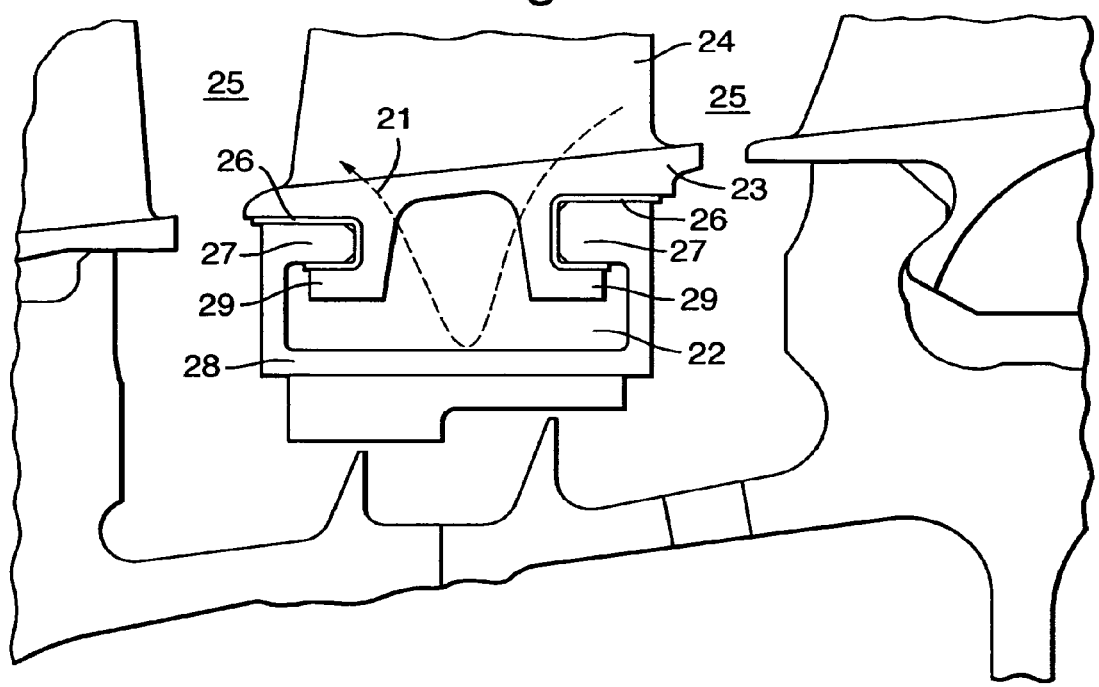
Fig.4.
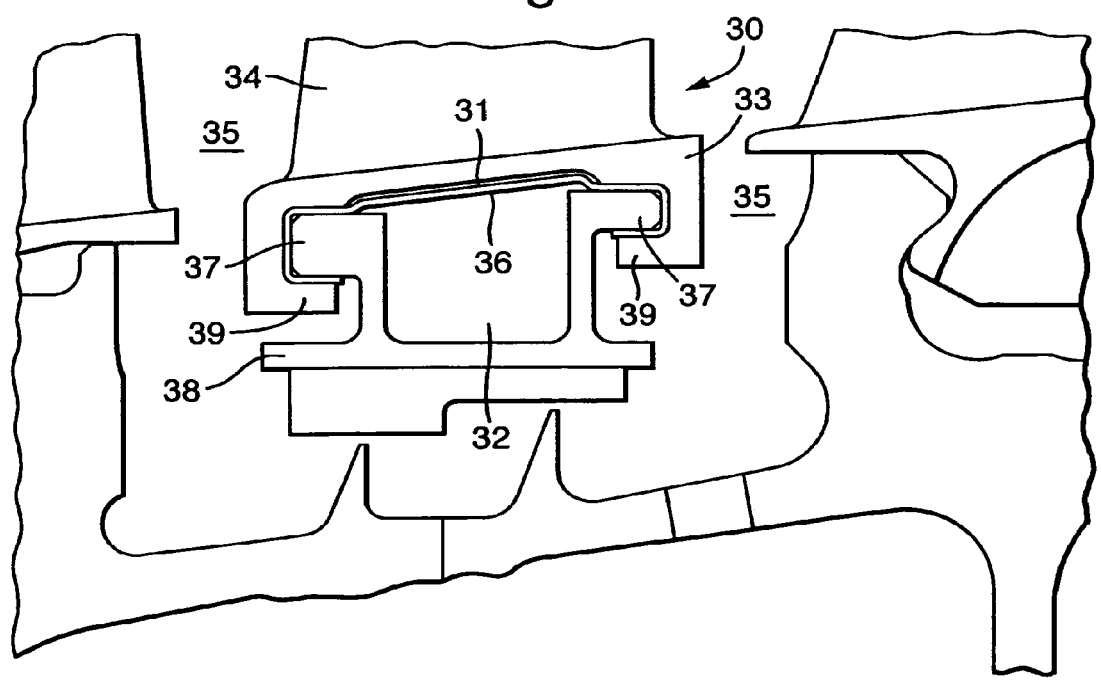

SEAL ARRANGEMENT

FIELD OF THE INVENTION

The present invention relates to seal arrangements and more particularly to seal arrangements associated with stator vanes utilised in turbine engines.

BACKGROUND OF THE INVENTION

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 (and engine core), and a second air flow to the bypass stream, which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

It will be understood from the above that achieving most efficient engine operation is a prime objective in both the compressors and turbines. Stator vanes are utilised in order to re-orientate and direct fluid flow for most efficient operation in the engine. These stator vanes may be shrouded and either take the form of single vanes or cast spans of several vanes or single vanes welded or brazed into spans. In either event, each vane or span of vanes at its mounting end is formed upon a platform section, and in creating the vane structure about the circumference of the engine, there are a number of gaps between these platform sections. These gaps are provided to account for thermal expansion and vibration damping in operation of the engine. FIG. 2 shows inter-platform gaps 100 between platforms (101) upon which vanes 103 are presented.

Unfortunately, such gaps 100 also create a leakage path connecting the flow through the blade passage to the shroud ring cavity (22). FIG. 3 illustrates such leakage as broken lines 21 which pass into the cavity 22 via the gap created between a platform 23 of a first blade 24 and the next adjacent platform (not shown). As can be seen the leakage path creates the flow 21 into the cavity 22 and air from the cavity 22 then re-enters a vane passage 25. In such circumstances, the leakage flow 21 increases aerodynamic losses within each vane 24 row and so reduces compressor efficiency within an engine.

Existing shroud vane designs do not seal the blade passage flow 25 from the shroud ring cavity 22 and so are subject to loss generating leakage flow through the inter vane gap described above. This leakage flow will reduce compressor efficiency. It should be understood with regard to aircraft operations, additional weight in the form of sealing components may require consideration as to whether the sealing benefits are justified. As indicated above there is a necessity for platform gaps in order to accommodate for thermal expansion and for vibration damping, so that consequently the inherent aerodynamic losses may be simply accepted as unavoidable.

As also illustrated in FIG. 3, it will be noted that anti-fret liners 26 are provided between mounting portions 27 of the mounting shroud 28 and reciprocal mounting portions 29 of the platform 23. These anti-fret liners act to inhibit vibration or otherwise induced abrasive degradation in the mounting association between the members 27, 29.

SUMMARY OF THE INVENTION

In accordance with the present invention there is provided a seal arrangement for a turbine engine, the arrangement comprising an anti-fret member to inhibit fret degradation between a component and a hollow mounting, the anti-fret member shaped to extend underneath an inter-platform gap in order to at least inhibit air passage between the hollow mountings and with the vane passage.

Typically, the component is a compressor or turbine stator vane.

Generally, the hollow mounting is a shroud ring incorporating a hollow cavity to receive mounting members of the component. Generally, the anti-fret member is secured in use across the component against shoulder portions of that component. Typically, those shoulder portions are part of a platform of the component. Alternatively, the anti-fret member is secured across the opening against the sides of that opening.

Typically, the anti-fret member extends axially to seal underneath the inter-platform gap, and extends circumferentially across one or more components (vanes) to seal the gap between those components.

Also, in accordance with the present invention there is provided a turbine engine including a seal arrangement as described above.

BRIEF DESCRIPTION OF THE DRAWINGS

An embodiment of the present invention will be now described by way of example and with reference to the accompanying drawings in which:

FIG. 3 is a cross-sectional side view of a prior art seal arrangement in gas turbine engines; and FIG. 4 is a cross-sectional side view of a seal arrangement in accordance with the present invention.

DETAILED DESCRIPTION OF THE INVENTION

Figure 1:
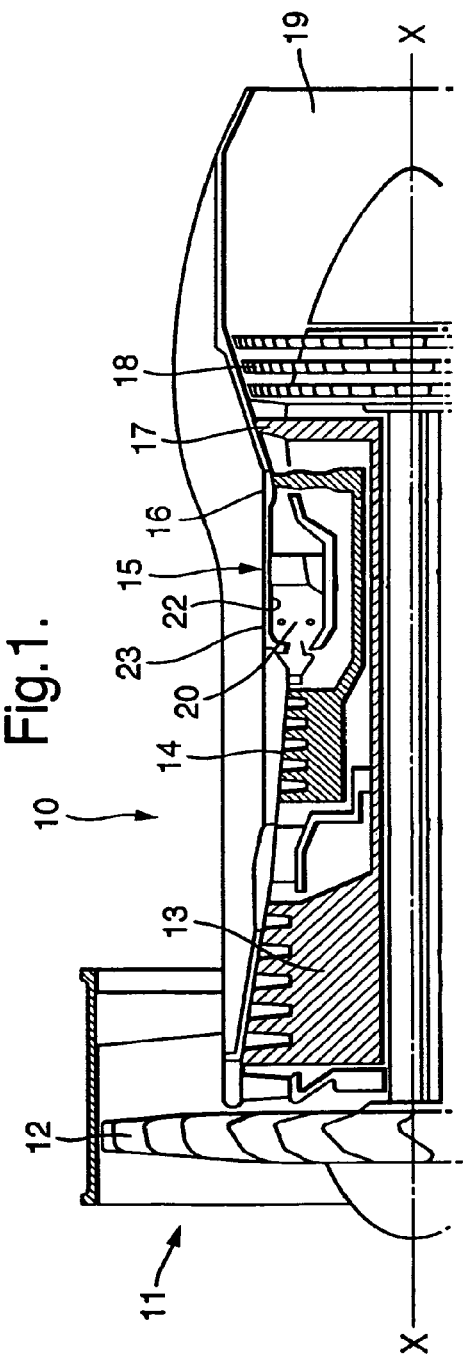
FIG. 1 is a schematic cross-sectional view of the top half of a ducted gas turbine engine.
Figure 2:
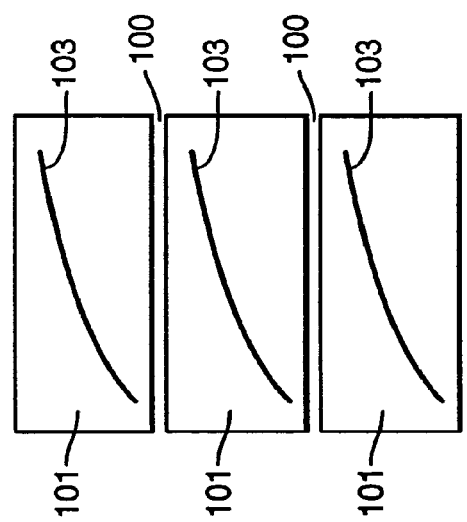
FIG. 2 is a top view of inter-platform gap between platforms which vanes are presented in a gas turbine engine.

As indicated above, anti-fret liner members are required in order to reduce the possibility of abrasive degradation of the mounting parts between a stator vane or blade and its mounting shroud. Thus, an arrangement 30 as depicted in FIG. 4 comprises a stator vane 34 secured through a platform part 33 to a mounting shroud 38 through mounting parts 37, 39. The mounting shroud ring 38 incorporates a cavity 32 which, as indicated previously in the normal course of events would be subject to inlet of leakage airflow from the blade/vane passages 35 through the inter-platform gap, causing aerodynamic losses. However, in accordance with the invention, an anti-fret liner 36 is provided which extends across the opening to the cavity 32 of the hollow mounting 38, and underneath the inter-platform gap, in order to prevent any air leakage both in and out of the cavity 32.

In the above circumstances the anti-fret liner 36 provides the dual functions of resisting abrasive degradation between the mountings 37, 39 and inhibiting or minimising air leakage or re-circulation into the cavity 32 which as indicated previously will cause aerodynamic losses and therefore reduction in compressor efficiency. The anti-fret liner 36 essentially comprises a clip which at least extends below the gap between adjacent platform 33 portions of vanes 34.

The anti-fret liner 36 extending beneath the platform 33 gap between adjacent vanes 34 isolates the shroud cavity 32 from airflows within the blade passage 35. This isolation prevents leakage of airflow from the blade passage 35 and likewise return flow from the cavity 32 into the passage 35. With such inhibited leakage there is a reduction in aerodynamic losses within the particular blade row and so an increase in compressor efficiency. It will also be understood that any disturbance to flow within the blade passage 35 will also be reduced so that there is an improvement in flow out from the stator vane 34 into the next blade row in the compressor direction.

The above benefits of minimising air leakage are achieved with the anti-fret liner 36 and so do not require a new component, which as indicated has significant benefits with respect to aircraft weight as well as engine assembly considerations. The fret liner 36 in accordance with the present invention has a second function which is to provide an effective seal across the opening of the cavity 32 and under the inter-platform gap, in order to prevent the detrimental effects of air leakage 31. Furthermore, by the use of a single anti-fret liner 36 it will be understood that there is an actual part reduction from the two part anti-fret liners 6 utilised in existing configurations (FIG. 3).

In order to facilitate assembly of the combined seal and anti-fret liner 36, it will be understood that a part of the liner 36 may be formed or rendered flexible. Thus, location of the liner 36 either already in association with the platform 33 on one side of the inter-platform gap or not will be secured upon the mounting portion 37 and then subsequent platforms located over that liner 36 in order to at least prevent direct passage to the cavity 32 through the gap with resultant air leakage, and as indicated above, aerodynamic losses.

Rather than providing a liner 36 which extends across the opening to the cavity 32, as illustrated in FIG. 4, it will be understood that a combined seal and anti-fret liner could be formed which is located against the shroud ring rather than the stator vane platform 33. In such circumstances the combined seal and anti-fret liner would operate in a similar fashion to that of the liner described in FIG. 4, that is to say by providing a barrier inhibiting air leakage and therefore aerodynamic losses. Thus, a combined seal and fret liner would extend outwardly from the cavity towards the bottom of the platform section in order to provide a barrier and therefore inhibit leakage. However, such an arrangement would be complicated to manufacture and assemble.

Further alternatively a seal separate from the anti-fret liner, may lie between indented channels formed just below the bottom of the vane platform and above the cavity so that the seal extends across the inter-platform gap between adjacent platforms to provide a blocking sealing effect.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A seal arrangement for a turbine engine, the engine comprising a gas passage, the engine further comprising a plurality of components having shoulder portions mounted in a hollow mounting and projecting into the gas passage, the arrangement comprising an anti-fret member to inhibit fret degradation between a component and the hollow mounting, the anti-fret member being shaped to extend across an opening to the hollow mounting and underneath the gap between two adjacent components in order to at least inhibit air passage between the hollow mounting and the gas passage wherein the component and hollow mounting member comprise mounting flanges and the anti-fret liner is interposed between the mounting flanges of the component and the mounting flanges of the hollow mounting member.

2. An arrangement as claimed in claim 1 wherein the component is a turbine stator vane or a compressor stator vane.

3. An arrangement as claimed in claim 1 wherein the hollow mounting is a shroud ring incorporating a hollow cavity to receive mounting members of the component.

4. An arrangement as claimed in claim 1 wherein the anti-fret member is secured across the opening against the sides of that opening.

5. An arrangement as claimed in claim 1 wherein the anti-fret member extends circumferentially across one or more components to seal any gap between those components.

6. A turbine engine including a seal arrangement as claimed in claim 1.

7. A seal arrangement for a turbine engine, the engine comprising a gas passage, the engine further comprising a plurality of components having shoulder portions mounted in a hollow mounting and projecting into the gas passage, the arrangement comprising an anti-fret member to inhibit fret degradation between a component and the mounting, the anti-fret member shaped to extend across an opening to the mounting and underneath the gap between two adjacent components in order to at least inhibit air passage between the hollow mounting and the gas passage wherein the anti-fret member is secured in use across the component against the shoulder portions of that component.

8. A seal arrangement for a turbine engine, the engine comprising a gas passage, the engine further comprising a plurality of components having shoulder portions mounted in a hollow mounting and projecting into the gas passage, the arrangement comprising an anti-fret member to inhibit fret degradation between a component and the mounting, the anti-fret member shaped to extend across an opening to the mounting and underneath the gap between two adjacent components in order to at least inhibit air passage between the hollow mounting and the gas passage wherein the anti-fret member is secured in use across the component against shoulder portions of that component and wherein those shoulder portions are part of a platform of the component and the opening is underneath an inter-platform gap.

* * * * *